G. M. PARKS.
HIGH PRESSURE GAS TANK VALVE.
APPLICATION FILED NOV. 6, 1915.
1,223,899.
Patented Apr. 24, 1917.
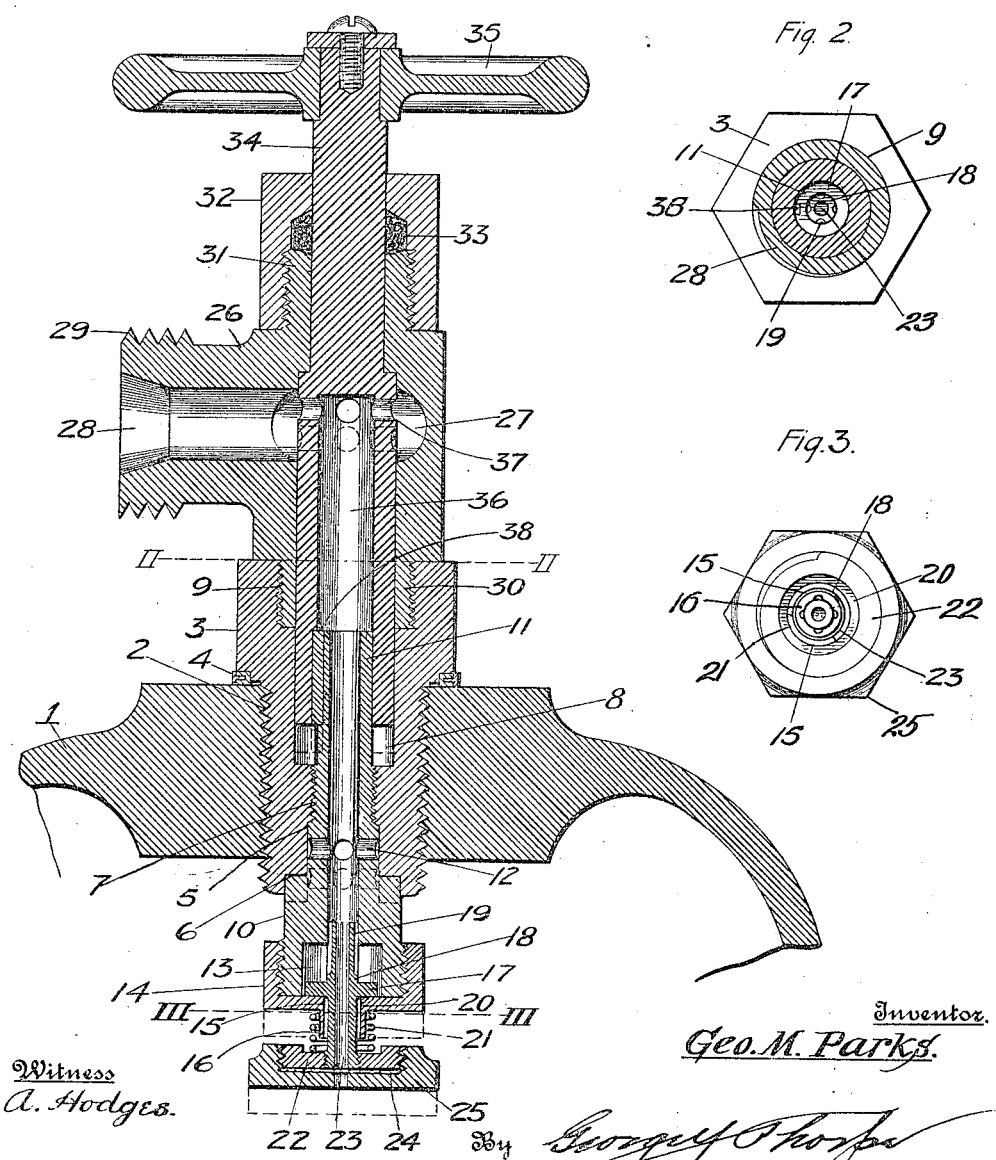

UNITED STATES PATENT OFFICE.

GEORGE M. PARKS, OF KANSAS CITY, MISSOURI, ASSIGNOR OF ONE-HALF TO ANDERS LARSEN, OF KANSAS CITY, MISSOURI.

HIGH-PRESSURE-GAS-TANK VALVE.

1,223,899.

Specification of Letters Patent.   Patented Apr. 24, 1917.

Application filed November 6, 1915.   Serial No. 60,160.

*To all whom it may concern:*

Be it known that I, GEORGE M. PARKS, citizen of the United States, residing at Kansas City, in the county of Jackson and State of Missouri, have invented certain new and useful Improvements in High-Pressure-Gas-Tank Valves, of which the following is a specification.

This invention relates to high pressure gas tanks and has for its object to produce a high pressure gas tank provided with an internal valve which cannot be unseated accidentally. Another object is to produce a detachable handle and coupling for an internal valve for gas tanks; said handle and coupling being applied in operative position when it is desired to draw gas from the tank and removed from operative position so that the tank may be shipped or stored without danger of accidental opening of the valve or injury to the stem thereof.

A further object is to produce a tank having a relief valve adapted to automatically open under excessive pressure and reclose when the pressure is reduced to normal.

A still further object is to provide a tank having an exhaust disk or diaphragm in operative relation with the relief valve and adapted to rupture and permit all of the gas to escape from the tank, in the event the relief valve fails to open to reduce the pressure.

With the above objects in view, the invention consists in certain novel and peculiar features of construction and combinations of parts as hereinafter described and claimed; and in order that it may be fully understood reference is to be had to the accompanying drawing, in which—

Figure 1, is a central vertical section of the upper part of a high pressure gas tank equipped with valve mechanism embodying my invention.

Fig. 2, is a section on the line II—II of Fig. 1.

Fig. 3, is a section on the line III—III of Fig. 1.

In the said drawing, 1 indicates a tank such as commonly employed for holding oxygen or any gas under high pressure. The tank is provided at its upper end with a threaded opening 2 engaged by a screw plug 3, a suitable gasket 4 being interposed between the head of the plug and the top of the tank to guard against leakage. The plug is provided with a bore or passage 5 terminating preferably in an enlargement forming a downwardly facing valve seat 6. A short distance above the valve seat the bore or passage 5 is threaded at 7 and above the threaded portion, the passage is enlarged at 8 and further enlarged at the upper end of the plug at 9, the enlargement 9 being threaded. 10 is a valve to engage the seat 6 and thus cut off communication between the interior of the tank and the bore or passage 5 under normal conditions. The valve 10 is provided with a tubular stem 11, which extends up into enlargement 8 of the bore of the plug and is threaded for a part of its length for engagement with the threaded portion 7 of the bore of the plug and between the face of the valve and its threaded portion, the stem is provided with a series of radial ports 12, so that when the valve is screwed inwardly to substantially the position shown by dotted lines gas can pass from the tank over the valve and through the ports 12 to the interior of the tubular stem 11.

The passage of the stem continues downward through the body of the valve and at the lower end of the latter is expanded into a chamber 13, and secured upon the lower end of the body of the valve is a cap 14, provided with a central opening having offset gas passages 15, said opening and passages being given greater length by the provision of the cap with a depending nipple 16.

A relief valve 17 is arranged within the bore or enlargement 13 of the valve and is provided with a guiding stem 18 projecting upwardly a sufficient distance to find a bearing in the small part of the bore of the valve and said stem is provided with passages 19 through which gas may pass upward when valve 17 is unseated.

The relief valve is also provided with a stem 20 extending downward through the opening in cap 14 and the nipple 16, the latter providing an extended bearing for said stem and also serving to centralize a spring 21 bearing against an underside of the cap 14 and the upper side of the enlargement or head 22 secured on the lower end of the stem, this arrangement serving to hold the valve 17 seated unless the tank is charged too heavily. If the charge is too great, the spring will yield owing to the pressure of gas on the under side of valve 17 and the excess pressure will escape up through passages 15, the expanded portion 13 of valve 10, and passages 19 into the bore or passage of stem 11, the valve being automatically reseated by the spring when the pressure in the tank drops to normal or predetermined pressure.

To provide for the exhaustion of the gas from the tank in the event that it is charged too heavily, that is to a dangerously high pressure and the relief valve should fail to open to relieve the pressure, a passage 23 is formed through the valve 17 and its stem and is closed at its lower end by a thin metal disk or diaphragm 24, held in place by a perforated screw cap 25 secured upon the enlargement or head 22 of stem 18. Under normal conditions this exhaust disk 24 will be functionless as it will be of greater resisting power than spring 21. In the event however, that said spring can not yield through the sticking of the valve 17, the high pressure will effect the rupture of the disk 24 at its central point and thus permit the gas to exhaust from the tank through the perforated cap, said disk and the passage 23 into the bore or passage of the valve stem 11.

Assuming that the tank is charged and the valves and disk are in place, it will be seen that the head 3 is the only part exposed to an accidental blow such as may be caused by the tank falling over or something falling upon the tank. It will thus be seen that the tank can be shipped or stored with practically no danger of the unseating of valve 10.

To effect the unseating of the valve 10 to obtain a supply of gas from the tank, the following mechanism is provided: 26 is a T-coupling provided with an enlargement or chamber 27 in communication with the discharge passage 28 in the stem portion of the coupling, and said stem portion is preferably threaded as at 29 for connection by a union, not shown, with a hose or equivalent pipe leading to a container to be supplied with gas. The coupling is arranged horizontally, and at one end of its head is provided with a threaded nipple 30 to take into the threads of bore enlargement 9 of the plug. The head is provided at its upper end with a threaded nipple 31 to be engaged by a packing nut 32 containing any suitable packing 33 and extending vertically through the coupling and said packing nut and packing is a cylindrical stem 34 provided with a hand wheel 35 at its upper end. The lower half of the stem is provided with a passage 36 and with ports 37 in communication with chamber 27. The stem extends beyond the lower end of the coupling and fits in the enlargement 8 of the bore of the plug, and to interlock said stem with the stem of the valve 10, a key or spline 38 is provided, the same being secured either to the valve stem or to the handle stem and slidably engaging a groove in the other of said elements so that when the hand wheel 35 is turned in one direction it will screw the valve stem downward until the valve 10 has attained the unseated position hereinbefore referred to and indicated by dotted lines, to permit the gas to escape from the tank into the bore of the valve stem as hereinbefore explained and thus pass up through passage 36 and ports 37 into chamber 27 and thence through passage 28. Reverse rotation of the hand wheel effects the closing of the valve and after the latter is closed the coupling 26 may be unscrewed and then pulled upward to effect the withdrawal of the handle stem from engagement with the valve stem.

With low pressure gas tanks, the relief valve will be unnecessary, and in this event cap 14, and said valve 17 and spring 21 will be removed and the cap 25 will be screwed upon the lower end of the valve body with the exhaust disk 24 interposed between it and the valve body to close the enlargement 13.

From the above description it will be apparent that I have produced a high pressure gas valve possessing the features of advantage enumerated as desirable in the statement of the object of the invention and I wish it to be understood that while I have illustrated and described what now appears to me to be the preferred form of the invention, I wish it to be understood, that I do not desire to be restricted to the exact details of construction and arrangement shown and described but reserve the right to make all changes properly falling within the spirit and scope of the appended claims.

I claim:

1. A gas tank, provided with a tubular plug having a valve seat; a valve provided with a stem having an adjustable relation with the plug, a bore or passage and an opening above the valve seat, communicating with said bore or passage; a coupling removably secured to the outer end of the plug; a handle stem journaled in the coupling and detachably interlocked with the valve stem for turning the same to effect valve unseating or valve seating adjustment of said stem; and a yieldingly seated valve carried by the first-named valve and adapted to be unseated when the pressure in the tank rises a predetermined distance to guard against overcharging of the tank.

2. A gas tank, provided with a tubular plug having a valve seat; a valve provided with a stem having an adjustable relation with the plug, a bore or passage and an opening above the valve seat, communicating with said bore or passage; a coupling removably secured to the outer end of the plug; a handle stem journaled in the coupling and detachably interlocked with the valve stem for turning the same to effect valve unseating or valve seating adjustment of said stem; a yieldingly seated relief valve carried by the first-named valve and adapted to be unseated when the pressure in the tank rises a predetermined distance to guard against overcharging of the tank; and a disk carried by said relief valve and adapted in the event of failure of the latter to open under excess pressure in the tank to rupture under such pressure and permit the gas to escape from the tank.

3. The combination with a tank of a tube, a perforated cap upon the inner end of the tube within the tank, a yieldingly seated relief valve closing the perforation in said cap and provided with a tubular stem, a head screwed upon the inner end of said stem, a centrally perforated cap secured on said head, and a disk clamped between said head and cap and closing communication between the bore of said valve stem and the perforation of the last-named cap; said disk being adapted to rupture and establish communication between the interior of the tank and the bore of the valve stem in the event the said valve fails to open under a predetermined pressure in the tank.

In testimony whereof, I affix my signature, in the presence of two witnesses.

GEORGE M. PARKS.

Witnesses:
   H. C. RODGERS,
   G. Y. THORPE.

Copies of this patent may be obtained for five cents each, by addressing the "Commissioner of Patents, Washington, D. C."